No. 872,000.
PATENTED NOV. 26, 1907.
E. C. LITCHFIELD & D. GARST.
MANURE SPREADER.
APPLICATION FILED JUNE 11, 1906.
Fig. 1.
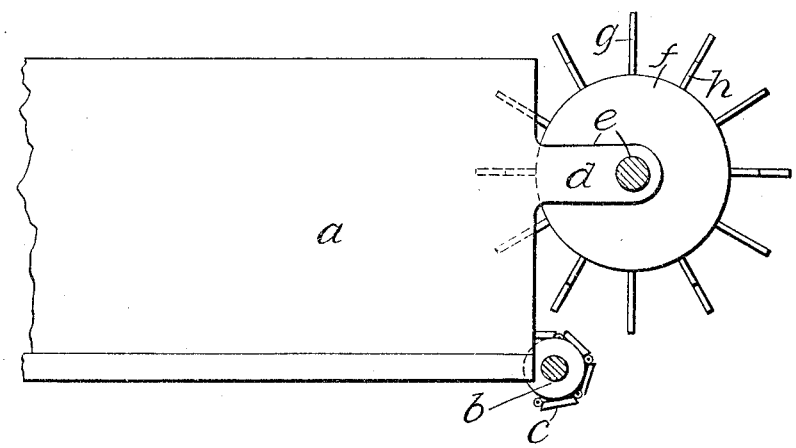
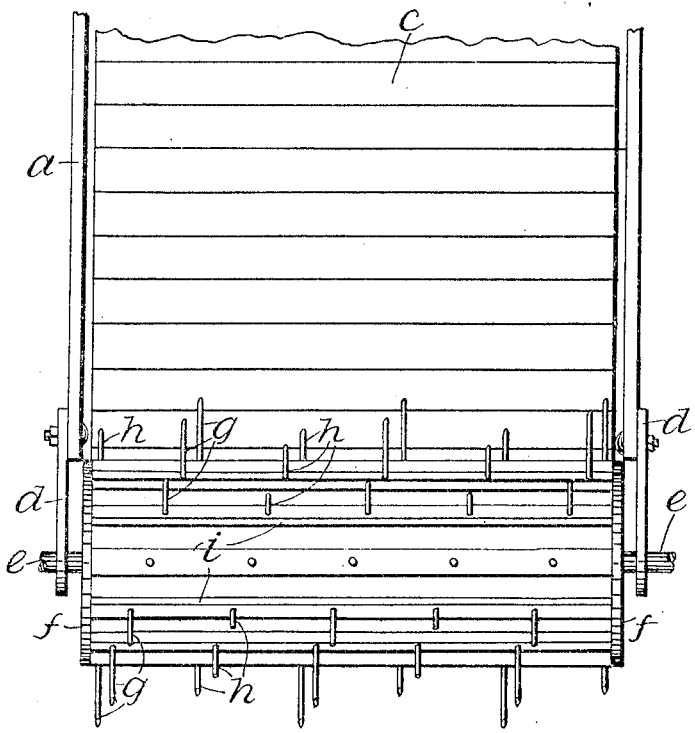
Fig. 2.
WITNESSES:
J. F. Albrecht
C. M. Jensen
INVENTORS
E. C. Litchfield &
Dudley Garst,
BY
G. C. Kennedy,
ATTORNEY

UNITED STATES PATENT OFFICE.

EDGAR C. LITCHFIELD AND DUDLEY GARST, OF WATERLOO, IOWA, ASSIGNORS TO THE LITCHFIELD MANUFACTURING COMPANY, OF WATERLOO, IOWA.

MANURE-SPREADER.

No. 872,000.     Specification of Letters Patent.     Patented Nov. 26, 1907.

Application filed June 11, 1906. Serial No. 321,169.

*To all whom it may concern:*

Be it known that we, EDGAR C. LITCHFIELD and DUDLEY GARST, citizens of the United States of America, and residents of Waterloo, Blackhawk county, Iowa, have invented certain new and useful Improvements in Manure-Spreaders, of which the following is a specification.

Our invention relates to improvements in manure spreaders, and the object of our invention is to so modify the arrangement and respective lengths of the different teeth along the exterior cylindrical periphery of the beater drum as to effect a more complete disintegration and delivery of masses of compacted manure than could be accomplished by the ordinary means. This object we have achieved by the means which are hereinafter described and claimed, and which are illustrated in the accompanying drawings, in which—

Figure 1 is a side elevation of the rear of a spreader box and beater drum, the forward end of said box being represented as being broken away, and Fig. 2 is a plan view of the same.

Similar characters of reference refer to similar parts throughout the several views.

Cow manure, which has become mixed and compacted with straw or tough wire grass, forms into large dense masses which are difficult to disintegrate and distribute evenly by means of a beater drum having teeth of an equal length. Such teeth either slide over such masses, or else discharge the lumps without proper disintegration. We have varied the arrangement and length of the beater teeth, in order to accomplish more efficiently the operations of breaking apart such dense compactions, as follows.

A beater drum $f$ may have its journals $e, e,$ rotatably mounted in brackets $d, d,$ the latter extending from the rear end of the spreader box $a$, or otherwise as desired, and said drum may be arranged to rotate near the rear end of a movable apron $c$, the latter moving over a roller $b$.

The drum-heads $f$ may be connected by separated longitudinal slats $i$, or may be attached to the ends of a cylinder, if desired, but in either event, the teeth $g$ and $h$ are radially attached to the cylindrical periphery of the drum. We have shown the teeth graded into two lengths, of which the teeth $h$ are but one half the length of the teeth $g$, and are alternately located in each row, the locations of the teeth on the several rows being such that while but few teeth are placed in any one row, one revolution of the drum will cause the separating space along the periphery of said drum to be swept at equal close intervals. We do not, however, mean to limit ourselves to the exact arrangement of location or spacing apart of the teeth as shown, as the arrangement may be widely varied in both particulars.

When a load composed of dense masses of compacted manure and straw or other tough binding material is carried toward and against the teeth of a beater drum like that herein shown, the longer teeth dig into the lumps while such lumps tend to push in upon the shorter teeth, and are thus spurred and agitated until completely disintegrated and delivered The effect is to greatly reduce the peripheral friction of the beater drum as also the draft of the machine, as the lumps of manure are segregated and broken apart separately, instead of bearing upon said drum in a solid mass as is the case when the teeth of the beater drum are of even length.

The teeth may be formed of more than two lengths or sizes if desired, as the principle involved in our invention is the use of varying lengths to effect a varied agitation and stirring of compacted masses, and a breaking up of the solid wall of material before the drum by separating its component lumps from each other to be separately disintegrated.

Having described our invention, what we claim as new and desire to secure by Letters Patent, is—

In a manure spreader, the combination of a movable apron, a beater-drum rotatably supported at one end thereof, and long and short distributing teeth alternately and spirally arranged upon the exterior periphery of said beater-drum.

Signed at Waterloo, Iowa, this 7th day of June, 1906.

EDGAR C. LITCHFIELD.
    DUDLEY GARST.

Witnesses:
 RAY HOLDIMAN,
 E. L. STOVER.